United States Patent

[11] 3,623,809

[72] Inventors Kenneth Victor Diprose; Arthur Stuart Forbes, both of Bath, England
[21] Appl. No. 887,486
[22] Filed Dec. 23, 1969
[45] Patented Nov. 30, 1971
[73] Assignee Hancock & Co. (Engineers) Limited Buckinghamshire, England

[54] OPTICAL SYSTEM WITH POLARIZING FILTERS FOR LINE FOLLOWER HEAD

5 Claims, 5 Drawing Figs.

[52] U.S. Cl. .......... 355/66, 355/71, 355/38, 355/68, 95/11 L
[51] Int. Cl. .......... G03b 27/70
[50] Field of Search .......... 355/20, 68, 66, 71, 80, 38; 95/11 L

[56] References Cited

UNITED STATES PATENTS

| | | | |
|---|---|---|---|
| 2,186,619 | 1/1940 | Sauer | 355/71 |
| 2,309,048 | 1/1943 | Curry | 355/38 X |
| 2,847,903 | 8/1958 | Modney | 355/38 X |
| 3,263,584 | 8/1966 | Knus | 95/11 L |

*Primary Examiner*—Samuel S. Matthews
*Assistant Examiner*—Edna M. Bero
*Attorney*—Berman, Davidson and Berman ABSTRACT: An optical system for a line follower head which avoids geometric errors and reflections, in which the beam from a light source is passed through a first polarizing filter to polarize the beam in one plane, then through a semireflecting surface to beam deflecting means to cause the beam to scan the outline carried on a substrate, the diffused and reflected light from the substrate being passed back along the same axis to the semireflecting surface and the light reflected therefrom being passed through a second polarizing filter set in quadrature with first polarizing filter to a photosensitive element.

Inventors.
KENNETH VICTOR DIPROSE,
ARTHUR STUART FORBES,
By
Berman, Davidson & Berman, Attorneys Inventors
KENNETH VICTOR DIPROSE,
ARTHUR STUART FORBES,
By
Berman, Davidson & Berman,
Attorneys.

Inventors.
KENNETH VICTOR DIPROSE,
ARTHUR STUART FORBES,
By
Berman, Davidson & Berman,
Attorneys.

OPTICAL SYSTEM WITH POLARIZING FILTERS FOR LINE FOLLOWER HEAD

This invention relates generally to line follower systems for following outlines, and more particularly to an improved optical system for use in line follower systems.

In scanning an outline in order to obtain control signals for controlling a machine, or a tool operating in a machine, it is normal practice to scan the outline either by causing a small spot of light to cross and recross the outline or to illuminate the portion of the outline being scanned uniformly and to move a photosensitive device in such a manner that a tiny field of view crosses and recrosses the outline. In either case a particular signal level is produced while the spot or the field of view is on either side of the outline and a change in the signal level is produced at the moment of crossing the outline. This difference in signal levels is employed to produce a control signal in a photosensitive element, and numerous known systems have been devised for this purpose.

If the substrate is illuminated from one or both sides of the portion of the outline being scanned certain errors arise. If a coaxial or coincident axis system is employed, in which a beam of light travels to the substrate along the same axis as the reflected light travelling to the photosensitive element, the axis being perpendicular to the plane of the substrate, difficulties arise due to reflections which may be from the outline itself if this is drawn in pencil or in an ink which, when dry, has a shiny surface, and from reflections within the optical system. The reflections from the outline may be avoided by tilting the line follower head so that the optical axis is no longer perpendicular but this introduces geometric errors. However, certain reflections also occur in the optical system itself and these cannot be avoided by tilting the line follower head. These internal reflections are due to light thrown back from the various shiny surfaces of the optical elements. The reflected light produces a standing direct current in the photosensitive element which may be quite large in relation to the outline-crossing signal. The large standing current would be of little significance in a static system but if a part of the optical system must rotate or oscillate, and the movement results in a small amount of modulation of the standing current due to changes in reflections, the modulation may well equal the crossing signal in magnitude.

The principal object of the invention is to provide a scanning system which is free from geometric errors and also avoids difficulties due to reflections by the use of polarizing elements.

The invention consists of an optical system for a line follower head comprising a light source to project a beam of light along an axis to a substrate bearing an outline to be followed, a first polarizing filter in the path of the beam to polarize the beam in one plane, a semireflecting surface set at an oblique angle to the beam axis through which the polarized beam passes, beam deflecting means to cause the beam to scan the outline, light diffused and reflected from the substrate and the outline passing back along the axis through the deflecting means to the semireflecting surface, a second polarizing filter set in quadrature with the first polarizing filter through which light reflected by the semireflecting surface is passed, and a photosensitive element to which the reflected light is passed from the second polarizing filter. Conveniently the two polarizing filters and the semireflecting surface are combined in a single element.

A preferred embodiment of the invention will now be described with reference to the accompanying drawings in which.

Figure 1:
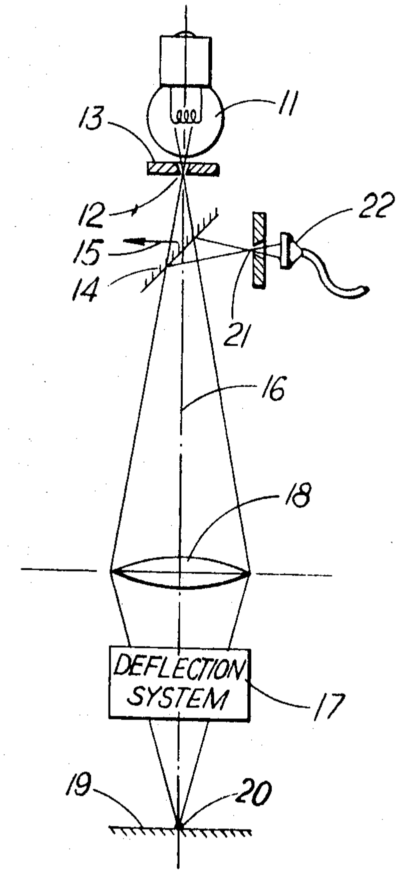
FIG. 1 shows a prior art coincident axis scanning system.

Referring to the drawings, FIG. 1 shows a prior art coincident scanning system comprising a light source 11 and an aperture 12 in an aperture plate 13 through which a portion of the light from the source 11 is passed. Below the aperture 12 is a semireflecting element 14 which may consist of a half silvered mirror that is to say a mirror which is provided with such a thin coating that one half of the light is reflected (to the left as shown by arrow 15 in the drawing) and the other half passes through the silvering. That part of the beam which has not been reflected continues along the optical axis 16 through a lens 18 to an element represented by block 17 which contains a deflection system. It may cause the beam to vibrate to and fro or to follow a small circular path. The beam next passes to a point on the substrate 19 upon which a small upstanding part 20 representing the outline is shown. In operation, the deflection system 17 causes the beam to vibrate to and fro across the outline or to follow a circular path which crosses the outline twice at each circular cycle. The light reflected from the substrate 19 passes back along the axis 16 until it reaches the element 14 where half of the light of the beam is reflected through a further aperture 21 to a photosensitive element 22.

This system suffers from the disadvantage that the photosensitive element 22 receives light not only from the surface of the substrate, which is often a sheet of drawing paper, but also from various shiny surfaces in the system. This last-mentioned light reaches the photosensitive element by specular reflection (as in a mirror) from the various polished glass surfaces of the optical elements. In consequence there is a minimum light level which is always present at the photosensitive element even at the instant when the beam is crossing the outline and even if the outline is jet black and nonreflective. This standing illumination produces a standing direct current in the photosensitive element which, although of substantial magnitude, would still be of minor significance if it were absolutely steady and there were no spurious modulation of the reflected light due to the moving parts of the deflecting system. This, however, cannot be achieved in practice and if the standing reflected illumination is modulated, even to a small extent, by the moving parts in the deflection system, this modulation may produce a signal of a magnitude comparable to that produced by the outline itself, so that the crossing signal may even be lost. This difficulty is greatly enhanced due to the fact that pencil lines and many ink lines, although black, are also shiny to a greater or lesser extent and in an extreme case it is found that with a coincident image system the light received by the photosensitive element may actually increase as the scanning spot crosses the outline. This effect may be overcome by tilting the scanning head with respect to the substrate, so that it is no longer perpendicular to the plane thereof, but this reintroduces geometric errors.

Figure 2:
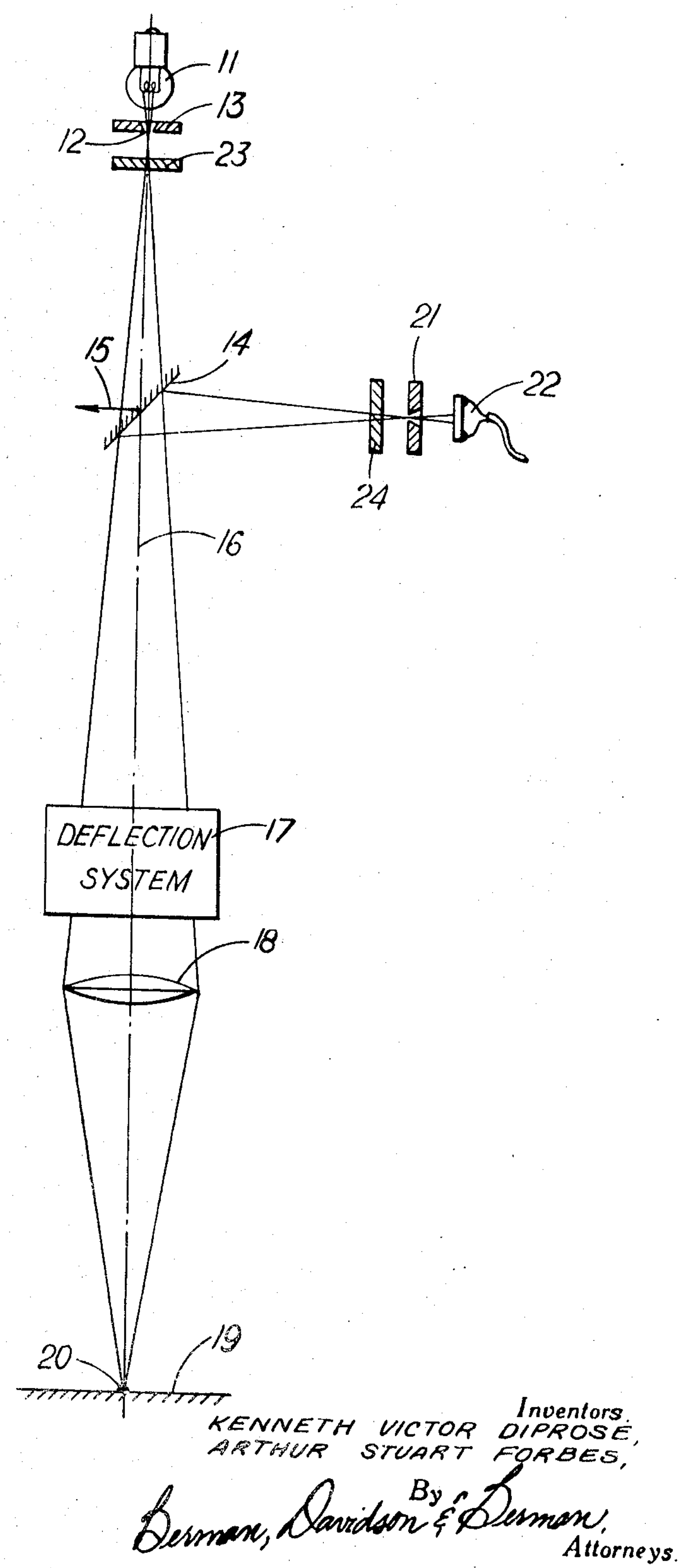
FIG. 2 shows a system similar to FIG. 1 but including two polarizing filters.

FIG. 2 shows a scanning system rather similar to that of FIG. 1 but with the addition of two polarizing filters, respectively 23 and 24. If the light from the first aperture 12 of FIG. 2 is plane polarized it will remain in this condition as it passes along the axis 16 to the lens 18 and the deflection system 17 to the substrate 19. When it reaches the substrate it is diffused so that it is no longer polarized. The diffused light reflected from the substrate through the elements 17 and 18 may then be partially reflected by the half-silvered mirror 14 and passed through the second polarizing filter 24 which is set in quadrature with the first polarizing filter 23. The effect of the second filter 24 will be to admit to the photosensitive element only that light which has lost the original plane of polarization, that is to say, light which has been diffused. Hence both the sources of reflected light referred to above retain the original plane of polarization due to the first filter 23 and consequently are prevented by the filter 24 from reaching the photosensitive element 22.

The arrangement illustrated in FIG. 2 produces two important advantages. The first is that the standing direct current in the photocell caused by reflected light from the optical components is substantially eliminated so that the change in the element current caused when the beam crosses the outline is correspondingly larger, and a considerably improved signal-to-noise ratio results. Moreover, since light due to specular reflection is largely prevented from reaching the photosensitive element the crossing of the outline produces a positive reduction in element current without the necessity for tilting the scanning head and thereby introducing geometric errors. However, these advantages are obtained at the expense of a substantial reduction of the signal level when using the two polarizing filters, since each filter absorbs approximately 50 percent of the light passing through it. Moreover, the ordinary polarizing filter is ineffective at light wavelengths near the infrared region so that this type of filter has little utility when the photosensitive elements are silicon photocells.

In the arrangement of FIG. 2 reflections have been inhibited but there is a heavy loss of light. Of the light which passes through the aperture 12 one half is lost in passing through the first polarizing prism 23. Of the remaining light one half is lost in passing through the semireflecting surface 14, so that (ignoring other losses) only one-quarter of the original light can reach the substrate. A part of this light passes back from the substrate along the axis 16 and of this light one-half is lost in being reflected by the semireflecting surface 14 while one-half of what remains is lost in passing through the second polarizing filter 24.

Crystalline materials, except those which crystallize in the cubic system, are birefringent, that is to say, they will separate an incident unpolarized beam of light into two separate plane-polarized beams, and they will do this at all wavelengths which the material is capable of transmitting. One of the beams obeys the normal law of refraction associated with isotropic materials and this is called the ordinary ray whereas the other ray, which is plane-polarized at right angles to the ordinary ray, does not obey the normal law and is called the extraordinary ray.

Figure 3:
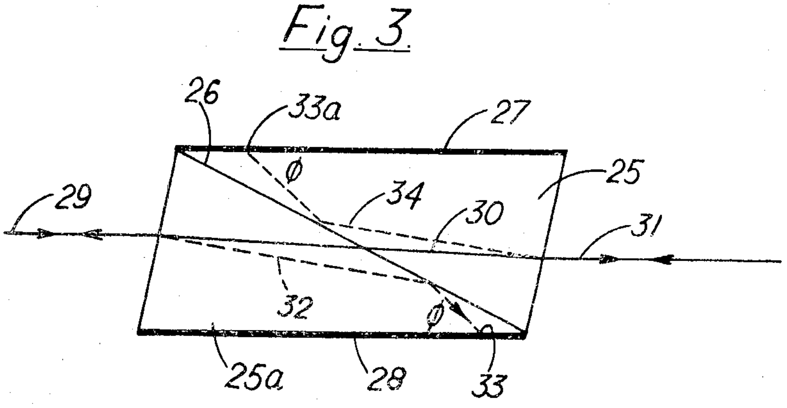
FIG. 3 shows a Nicol polarizing prism.

Prisms cut from such crystalline material can be arranged to transmit one of the polarized beams and divert the other, one well-known example being the Nicol prism which is commonly employed in polarizing microscopes and for other purposes. The normal Nicol prism is illustrated in FIG. 3 and comprises two wedge-shaped pieces, respectively 25 and 25*a*, which are cut in the appropriate direction in relation to the crystal axes of the two pieces and are cemented together along a line 26. The two large opposite faces are given black absorbent coatings, respectively 27 and 28. An unpolarized ray of light indicated at 29 passing from left to right in the illustration will be split into ordinary and extraordinary rays, the extraordinary ray passing through the prism along the line indicated at 30 and leaving the prism along line 31, while the ordinary ray will be directed along the dotted path shown at 32 and will strike the black coating 28 at the point 33, where it is absorbed. If the light passes through the prism in the opposite direction the extraordinary ray will follow the same path while the ordinary ray will be diverted along a path indicated by dotted line 34 and eventually absorbed by the black coating 27 at a point 33*a*.

The invention makes use of a prism of the kind described, so modified as to make available both rays when the light is passing through the prism in a particular direction and for the purpose of the invention a modified Nicol prism is very convenient.

Figures 4, 5:
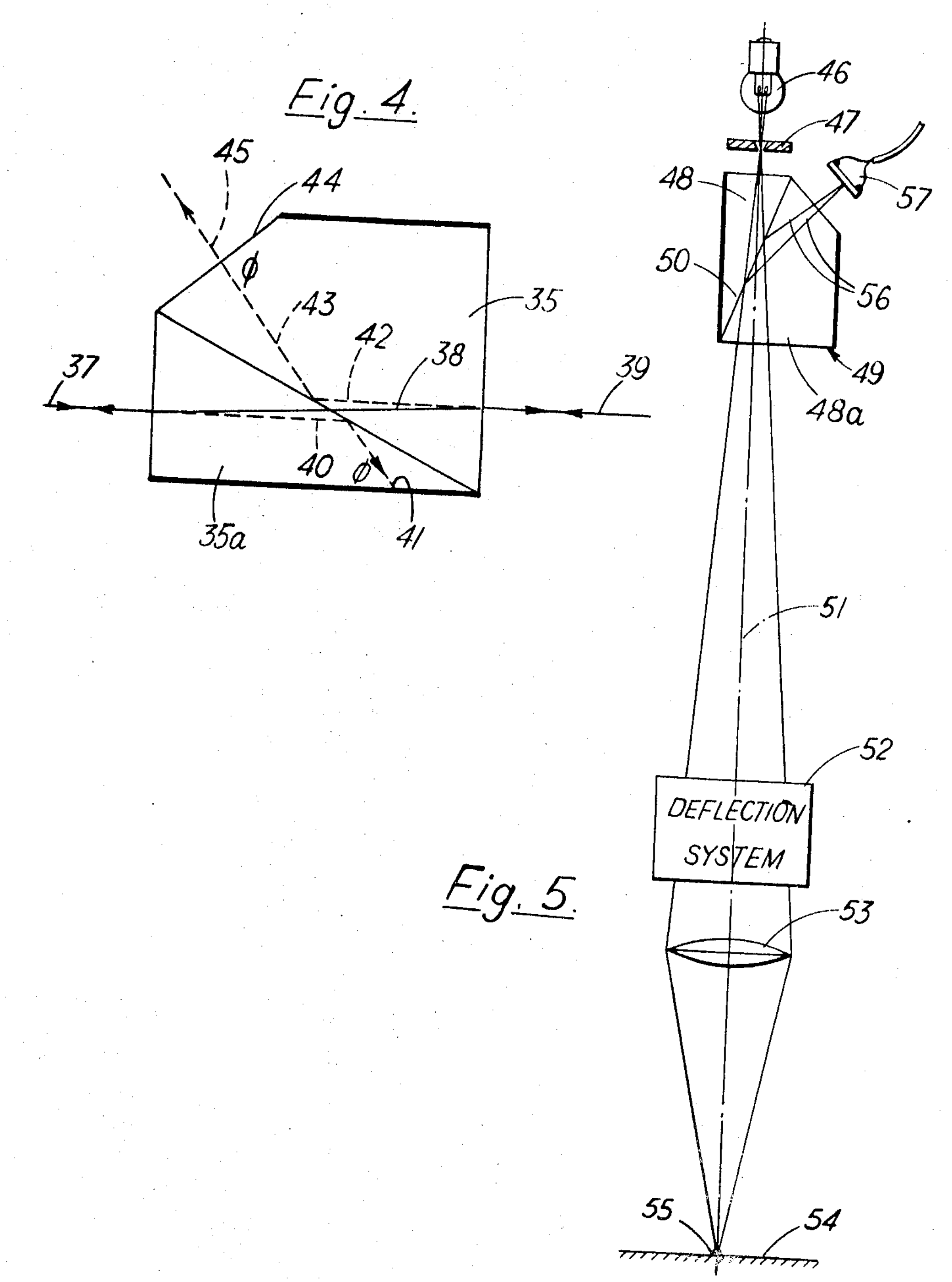
FIG. 4 shows a modified Nicol prism for use with the invention.
FIG. 5 shows a modified Nicol prism included in a scanning system according to the invention.

The general form of the modified prism shown in FIG. 4 is similar to that shown in FIG. 3 and comprises two pieces respectively 35 and 35*a* cemented together, the extraordinary ray passing along the lines indicated at 37, 38 and 39 when the light enters the prism at the left in the drawing, and the ordinary ray being diverted in the direction indicated by dotted line 40 to be absorbed by the black coating at the point 41. With light passing in the other direction, that is to say, from right to left in the figure, the extraordinary ray passes along the lines 39, 38 and 37, in that order, while the ordinary ray is diverted along a path 42 and reflected along the path 43. The prism is, however, cut away along a line 44 and the black coating is omitted along this line so that the ordinary ray now emerges from the prism along the dotted path 45.

FIG. 5 shows a coincident axis-scanning system employing the arrangement according to the invention. In this figure a light source is indicated at 46 and some of the light from the source passes through an aperture in an aperture plate 47 and immediately enters one part 48 of a modified Nicol prism generally indicated by reference 49. The ordinary ray is diverted as described above in connection with FIG. 4 while the extraordinary ray continues along the axis indicated by the dotted line 51 and is passed to a deflection system 52 which contains a movable element to produce a reciprocating beam or a beam which moves in a circular path as previously described. The emergent beam passes to the focusing lens 53 which focuses the beam to a point at the substrate 54, the outline on the substrate being indicated by the raised part 55. The light is diffused by the surface of the substrate and by the outline, and some of the diffused light passes back along the axis 51, through the focusing lens 53 and the deflection system 52 and into the second element 48*a* of the modified Nicol prism. Here the extraordinary ray passes back towards the aperture 47 and is lost but the ordinary ray is deflected as indicated at 56 to a photosensitive element 57.

The losses in the system of FIG. 5 are no greater than those of the known system of FIG. 1 since the loss of light is one-half in passing from the substrate to the photosensitive element.

From the foregoing description it will be apparent that the invention provides an optical system for a coincident axis-scanning system which completely avoids geometric errors and at the same time avoids the major disadvantage of the known type of coincident image-scanning system by substantially completely eliminating the effects due to specular reflection. Hence the system provides an output having very substantially improved signal-to-noise ratio. It is able to detect a pencil or ink outline with the scanning head mounted perpendicularly to the surface of the substrate.

The practical embodiment of the invention which has been described and illustrated makes use of a modified Nicol prism but it is to be understood that other types of prism which produce two separate plane-polarized rays may also be modified for the purpose of the invention. The Nicol prism has been chosen because it combines a large separation between the ordinary and extraordinary rays with a large angular field of view.

We claim:

1. An optical system for a line follower head comprising a light source to project a beam of light along an axis to a substrate bearing an outline to be followed, a first polarizing filter in the path of the beam to polarize the beam in one plane, a semireflecting surface set at an oblique angle to the beam axis through which the polarized beam is passed, optical means to focus the beam to a point at the surface of the substrate, beam deflecting means to cause the beam to cross and recross the outline continuously to generate line-crossing signals, light diffused and reflected from the substrate and the outline passing back along the axis through the deflecting means and the optical means to the semireflecting surface, a second polarizing filter set in quadrature with the first polarizing filter through which light reflected by the semireflecting surface is passed, and a photosensitive element to which the light passing through the second polarizing filter is directed.

2. A system as claimed in claim 1 in which the first and second polarizing filters are in the form of a single prism.

3. A system as claimed in claim 2 in which the prism is a Nicol prism which is modified by forming a flat surface at such an angle that the extraordinary ray in the returning beam may pass out of the prism through the said surface to the photosensitive element.

4. A system as claimed in claim 2 in which the semireflecting surface is incorporated in the prism.

5. A system as claimed in claim 4 in which the prism is a Nicol prism which is modified by forming a flat surface at such an angle that the extraordinary ray in the returning beam may pass out of the prism through the said surface to the photosensitive element.

* * * * *